April 19, 1966 A. A. READ 3,247,470

MAGNETIC FILM DEVICE USEFUL AS A MODULATOR

Filed Jan. 23, 1961 3 Sheets-Sheet 1

Inventor
Alvin A. Read
by Dawson, Tilton, Fallon & Lungmus
Attys

Inventor
Alvin A. Read
by Dawson, Tilton, Fallon & Lungmus
Attys

Inventor
Alvin A. Read
by Dawson, Tilton, Fallon & Lungmus
Attys

United States Patent Office
3,247,470
Patented Apr. 19, 1966

3,247,470

MAGNETIC FILM DEVICE USEFUL AS A MODULATOR

Alvin A. Read, Ames, Iowa, assignor to Iowa State University Research Foundation, Inc., Ames, Iowa, a corporation of Iowa Filed Jan. 23, 1961, Ser. No. 84,218
6 Claims. (Cl. 332—51)

This invention relates to a magnetic film device useful as a modulator, and, more particularly, to a device and method employing one or more thin magnetic films which can be useful for impressing a modulating voltage on a carrier.

An object of this invention is to provide a novel amplitude modulator circuit using a thin single domain ferromagnetic film. Another object is to provide a modulator which is, at the same time, both balanced and completely passive.

Still another object is to provide a modulator employing a thin magnetic film wherein the modulating signal rotates the magnetization to provide a coupling between carrier and output windings proportional to the modulating signal amplitude so as to produce suppressed carrier amplitude modulation.

Yet another object is to provide a modulator employing a thin single domain magnetic film which is characterized by minimal carrier feedthrough and which is substantially immune to the effects of a wide range of mechanical and thermal environments.

A further object is to provide a device and method capable of producing sideband outputs at harmonic frequencies of the carrier.

A still further object is to provide a device useful as a controlled coupling device between two circuits, i.e., a coupling device between two circuits whose degree of coupling can be controlled or otherwise gated by an external signal. A complementary-noncomplementary gate between two parametrons is an illustrative application.

A yet further object is to provide a device capable of achieving an output proportional to the *n*th power of the absolute magnitude of the modulating signal, irrespective of wave shape, where the highest frequency component of the modulating signal is substantially less than the carrier frequency. Such devices have advantageous application in providing real time correlation between two signals of which power measurement is a special case.

Other objects and advantages of the invention may be seen from the details of construction and operation as set down in this specification.

The invention will be explained in conjunction with the accompanying drawing, in which FIG. 1 is a perspective schematic view of a single magnetic domain thin film, with the applied fields indicated thereon;

The film employed here has been described in detail in the co-owned, copending application of Arthur V. Pohm and Alvin A. Read, Serial No. 50,691, filed August 19, 1960, and reference may be made to that application for details of construction and operation not herein given.

Figures 1, 2:
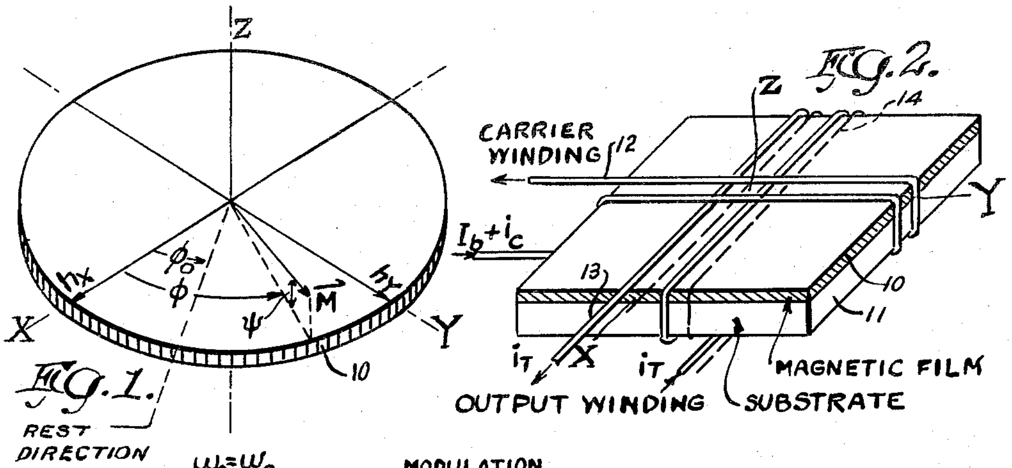
FIG. 2 is a schematic perspective representation of a thin film modulator embodying teachings of this invention.

The film 10 seen in FIG. 1 may be costructed of 80–20 (80% nickel, 20% iron) permalloy having a thickness of the order of $10^{-6}$ to $10^{-4}$ centimeters. To support this or other films such as ferrite, a substrate 11 (see FIG. 2) may be employed in the form of 0.002" to 0.006" thick glass. Other substrates besides glass, such as mica, copper and certain plastics such as Mylar could be used. These films may be vacuum or electrodeposited in the presence of an orienting external magnetic field to a thickness of 100–10,000 angstroms in the form of thin circular discs with a diameter of about a centimeter or less. Shapes other than discs are advantageous in some instances—because of the extremely thin geometry relative to the length and breadth dimensions, rectangular shapes are effective. Such films can have a low anisotropy in the plane of the film and a very large demagnetizing factor for rotation out of the plane of the film. Properly deposited films of this type can exist as essentially single magnetic domain structures.

The magnetization vector M (see FIG. 1) represents the intrinsic magnetic flux density of the material, which for 80–20 permalloy films, is about one weber per square meter. When there are no external magnetic fields, the vector M lies in the plane of the film in a direction called the easy or rest direction. The direction in the plane of the film but normal to the easy direction is called the hard or transverse direction.

FIG. 1 shows a coordinate system for a single domain thin film. Application of the external fields along the rest and transverse directions, respectively, will cause the magnetization vector M to rotate through the angles $(\phi-\phi_0)$ and $\Psi$ from its rest direction. The equation of motion for the vector M is very similar to that of the damped gyroscope. If the rest direction field is held constant and the transverse field varied sinusoidally with time, the tip of the vector M will precess in such a manner that its motion will trace out a path that is essentially a very flat ellipse. The large demagnetizing fields normal to the plane of the film effectively constrain the angle $\Psi$ and keep it from becoming very large. On the other hand, the low anisotropy of the film provides relatively small constraining forces in the plane of the film so that the angle $(\phi-\phi_0)$ can become quite large. For practical purposes then, the vector M can be considered as simply moving back and forth in the plane of the film. If both the rest and transverse direction fields vary rapidly with time but at different frequencies, the motion of the vector M can become quite a complicated Lissajous pattern. The motion of M, however, still remains essentially in the plane of the film. For practical considerations, rotation out of the plane of the film can be neglected or, at most, assumed small.

If FIG. 1 is considered for the case $\phi_0=0$, it will be noted that at a given static field Hy along the *y* direction will tend to rotate M through a given angle of $\phi$ proportional to this static field in the region of small $\phi$. The simultaneous presence of a high frequency field along with the *x*-direction will cause the vector M to be in a continuous state of motion. This will induce a voltage in a winding wound with its axis parallel to the $y$ direction. As long as $\phi$ remains small, this induced signal is directly proportional to the equilibrium angle of $\phi$ established by Hy. The phase of this induced signal is determined by the polarity of Hy.

A balanced modulator circuit may be constructed using an inductor fabricated in a manner similar to that shown schematically represented in FIG. 2. There, it is seen that a pair of mutually perpendicular windings are wound around the film with an alignment such that the axis of one winding (hereinafter called the carrier winding 12) is parallel to the rest direction of the film, while the axis of the second winding 13 (hereinafter called the output winding) lies parallel to the transverse direction of the film. A modulating winding 14 may be added in parallel with the output winding, or the output winding itself can be used as the modulating winding. If $\phi_o=0$, it is to be noted that because of the mutually perpendicular orientation of the windings, no voltage is induced in the output winding if no currents flow in either the modulating or output windings.

In describing the operation of the film modulator, a D.C. modulating input is somewhat easier to visualize than an A.C. input. It permits a simple qualitative description to be given of the balanced modulator operation. Suppose (in FIG. 2) a D.C. bias current $I_b$ and a single frequency carrier current $i_c$ at an angular frequency of $\omega_c$ flows in the carrier winding and that a D.C. current flows in *d* separate modulating winding 14. This current establishes a magnetic field in the transverse direction, producing a torque on the magnetization vector M and causing it to rotate through an angle $\phi$. This establishes a flux linkage in the output winding. Once vector M is rotated away from its rest position, the fields established by the A.C. carrier current in the carrier winding exert further forces on vector M. These alternating forces cause the vector M to be rocked back and forth around the static equilibrium value of $\phi$ established by the D.C. bias and modulating fields. The magnetic flux linking the output winding is therefore constantly changing. This induces a voltage in the output winding at the frequency of the carrier and of an amplitude determined largely by the value of the static equilibrium angle of rotation. Thus, for small values of $\phi$, the amplitude is proportional to the D.C. modulating current. Some non-linearity with repect to modulating current is to be expected, since this operation is based on a rotational phenomenon. This nonlinearity, however, can be kept small if the maximum angle of $\phi$ is kept small.

A time varying modulating current slowly rotates the vector M back and forth around the rest direction position establishing a slowly changing static equilibrium position. Application of the carrier current rapidly rocks M around this slowly changing equilibrium position inducing a voltage in the output winding proportional to the instantaneous value of the modulating current. This gives an amplitude modulated wave as the output signal. A variable capacitor can be placed across the terminals of the output winding and the output circuit tuned to resonance. This permits at least partial suppression of unwanted sidebands at harmonics of the carrier and increases the useful amplitude of the output.

Where the current in the carrier winding can be written as $I_b+I_c \cos \omega t$, so that $h_c=H_b+H_c \cos \omega_c t$, and where the maximum angle of rotation $\phi$ is limited to small values, the inductance of the output winding can be written as $$L_t=L_a+L_o\left[(A_0/2)+\sum_{n=1}^{\infty} A_n \cos n\omega_c t\right] \quad (1)$$

where with $$\gamma=\frac{H_c}{H_k+H_b}$$

we have $$A_n=\frac{2}{\sqrt{1-\gamma^2}}\left[\frac{-1+\sqrt{1-\gamma^2}}{\gamma}\right]^n;\ n-0,1,2 \quad (2)$$

In the preceding, $L_a$ is the air inductance of the output winding if all magnetic material were removed and $L_o$ is the component of inductance due to the presence of the material under the internal field conditions established by the external bias field $H_t$ and the internal anisotropy field $H_k$.

To simplify the conceptional approach, but without any loss of generality, assume that the output winding is also to serve as the modulating winding, and assume that a periodic modulating current of $i_M$ flows in it. One can express such a modulating current as:

$$i_M=\sum_{m=0}^{\infty} i_m \sin(\omega_m t+\theta_m) \quad (3)$$

where (3) can be considered to represent either the sum of a set of independent currents or the Fourier series of a timewise complex current. One can now take the product of (1) and (3) to find the flux linkage in the output winding. By taking the time derivative of this product, one can obtain the instantaneous voltage induced across the terminals of the output winding as $$e_T=(L_a+L_o)\sum_{m=1}^{\infty} I_m\omega_m \cos(\omega_m t+\theta_m) \quad (4)$$
$$+\sum_{n=1}^{\infty}\sum_{m=0}^{\infty} A_nL_aI_m/2\{(n\omega_o+\omega_m)\cos[(n\omega_o+\omega_m)t+\theta_m]-(n\omega_o-\omega_m)\cos[(n\omega_o-\omega_m)t-\theta_m]\}$$

We see from (4) that the voltage across the terminals of the output winding contains, among other frequencies, the sideband sum and difference frequencies of the carrier and the modulation components, but no carrier frequency as such. Since the values of the $A_n$'s for $n>1$ are smaller than $A_1$ for all carrier amplitudes and much smaller for small $\gamma$, (4) can be approximated for small $\gamma$ as $$e_T=(L_a+L_o)\sum_{m=1}^{\infty} I_m\omega_m \cos(\omega_m t+\theta_m) \quad (5)$$
$$+\sum_{m=0}^{\infty} A_1L_0I_m/2\{(\omega_c+\omega_m)\cos[(\omega_c+\omega_m)t+\theta_m]-(\omega_c-\omega_m)\cos[(\omega_c-\omega_m)t-\theta_m]\}$$

The output of the modulator can be taken as the voltage across the terminals of the output winding. It is evident that tuning the output circuit with a capacitor across the output terminals will reduce those sideband components of the harmonics of the carrier frequency that do exist. Furthermore, since the maximum modulating frequency in any practical system must be limited to values considerably below the carrier frequency, the first summation in (5) will normally be small compared with the second summation so that the second predominates for any reasonable magnitude of carrier amplitude. The fact that the amplitudes of the two sidebands are somewhat different is of no real concern since this can be corrected by the gain-frequency characteristics of the amplifying stages that always follow such modulators.

The preceding analysis is based upon the premise that the two windings are mutually perpendicular to each other and that the axis of the carrier winding is exactly parallel to the rest direction of the magnetization, i.e., that $\phi_o=0$. If this is not quite the case and the carrier winding axis is tilted somewhat from being parallel to the rest direction, a voltage at the carrier frequency will be induced in the output circuit even with no modulating signal present. By a suitable choice of an external magnetic field and/or rotation of the output winding, it is possible to find an equilibrium point where the zero-modulation induced carrier voltage in the output winding is again zero. The system, however, no longer has the simple symmetry of FIG. 2. Because of the anisotropy of the film, the equilibrium angle of rotation $\phi$ of the vector M will be different for a positive instantaneous magnitude of modulating signal than for a negative one of the same magnitude. Thus, unless the system is completely symmetrical, as illustrated in FIG. 2, there will be a substantial carrier feedthrough into the output circuit with modulation and true balanced modulator operation will not occur. Any practical system utilizing this technique should therefore have a means for accurately aligning the two windings and the film relative to one another.

If the application of the modulator is such that a certain amount of carrier feedthrough with modulation is permissible, then it is possible to use a static magnetic field in the transverse direction of such a polarity and magnitude that the carrier feedthrough in the absence of a modulating signal is zero even though the windings and the film are not perfectly aligned. For small signal operation, the carrier feedthrough with modulation will remain quite small. This transverse direction field can be supplied either by a separate external magnet in the form of a permanent magnet, or a winding in which a D.C. current flows or as a D.C. current component added to the modulation signal.

It is possible using a technique of this type to produce an amplitude modulated output containing any ratio of carrier signal in the output to sideband signals in the output that may be desired. This includes the possibility of conventional amplitude modulation with the inventive modulator in which case the carrier power in the output is always equal to or greater than the power in the sidebands.

One of the advantages of magnetic films such as those of permalloy for application in balanced modulators is their relatively stable characteristics as a function of temperature (i.e., negligible temperature coefficients), particularly with respect to the magnitude of the magnetization and of the rest direction over the temperature range of $-100$ to $+100$ degrees centigrade. Furthermore, the frequency characteristics of permalloy are such that one may build modulators using permalloy films that operate with carrier frequencies from a few hundred kilocycles to several hundred megacycles.

Figure 3:
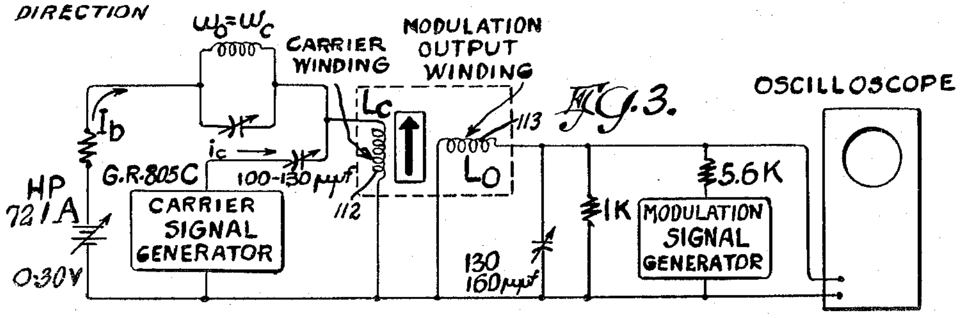
FIG. 3 is a diagrammatic picturization of a thin film balanced modulator circuit.

FIG. 3 shows the circuit employed for experimental testing of the inventive modulator. A single winding 113 was used both as the modulating and as the output winding. The carrier frequency was kept constant at 4 megacycles per second. The circuit response was flat when employing modulating frequencies from 20 to 20,000 cycles per second.

The output wave form was observed across a composite common modulating output winding that was very loosely wound, permitting the film to be rotated independently of the other windings. This permitted observations of the effects of the alignment of the film with respect to the carrier winding 112. Because of the high air inductance of this winding relative to that due to the film, the response of the system was badly deteriorated at square wave modulating frequencies in excess of 50 kilocycles. In this situation, the first term of (5) is not negligible with respect to the other terms.

A second modulator was constructed with its modulating output winding tightly and rigidly wound around a sandwich of two films cemented together. Since the exact rest direction of the film was difficult to determine, the axis of this winding was not aligned exactly normal to the film's rest direction. The greater volume of magnetic material and the increased coupling between the film and the output winding resulted in a threefold increase in output voltage of this second modulator for the same carrier winding and carrier winding current and for the same amplitude of modulating signal. It was seen that when, for a sinusoidal modulating input, the application of the modulating output winding was adjusted for equal the spacing of the output nulls, as seen on the oscilloscope, the peaks of the modulated output had alternately different amplitutdes. On the other hand, it was noted that when the winding and an external magnetic bias were adjusted to produce equal peaks of modulation, the nulls were no longer equally spaced in time. This is a consequence of the lack of symmetry assumed previously, and results in carrier feedthrough. Some carrier feedthrough was a consequence of the capacitive coupling between the carrier and the output winding. This can be reduced by proper capacitive balance and by the use of an electrostatic shield between the carrier and output windings.

Measurement of the temperature characteristics proved quite difficult. Mechanical construction of the first model was such that alignment in an enclosed oven was nearly impossible. However, with several millivolts carrier feedthrough due to this misalignment compared with a peak modulated output of several hundred millivolts, an increase in temperature of 100° C. resulted in an increase in carrier feedthrough of less than 50%. This is attributed as being largely due to the change in the anisotropy constant of the film and not upon any change in the rest direction of the film.

The problem of aligning the two windings in the film can be attacked in two ways. It is possible to deposit films that have a much smaller anisotropy that films tested herein. This will of itself make the system much less sensitive to alignment, although some of the problems still remain.

Figure 4:
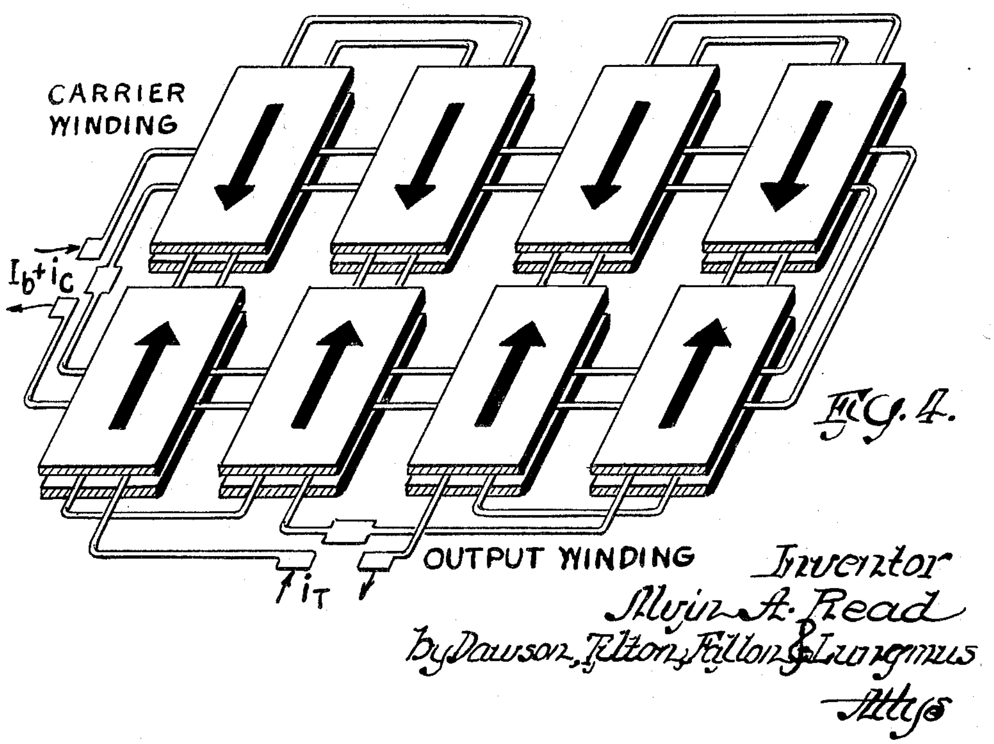
FIG. 4 is a thin film modulator employing sandwich-type construction according to the teachings of the invention.

Another attack on the alignment problem is to use a sandwich technique, as seen in FIG. 4. In addition, low anisotropy films could be used advantageously here. One of the windings can be etched on one side of a thin etched-circuit board and the other etched mutually perpendicular on the opposite side. The arrangement shown has a zero mutual inductance between the output and the carrier windings in the absence of any films. Capacitive coupling can be minimized by connecting the center tap on one or both windings to the ground plane of the overall system.

In FIG. 4, eight films are deposited in a common substrate with their easy directions parallel to each other and to the center line of the output winding. When these eight films are mounted film side down nearest the etched wiring with only a thin insulation separating the winding and the film, provision is made for eight more films to be similarly placed on the underside. As the modulating current varies, the magnetization vector will rotate. The system functions exactly as described previously for FIG. 2. Since the two windings are mutually perpendicular to each other and fixed, the alignment procedure reduces to one where the films alone are moved. Once alignment is achieved, this sandwich may be encapsulated to make the alignment permanent. To provide shielding against stray magnetic fields, the entire sandwich should be magnetically shielded by a high permeability material.

It can be seen by expanding (2) that $A_1$ is directly proportional to $\gamma$ for small values of $\gamma$. Likewise $A_2$ is directly proportional to $\gamma^2$ for small $\gamma$'s. In view of this, it is to be noted that the sideband signals of the carrier fundamental that are induced in the output winding are, for a fixed modulating signal, directly proportional to the carrier amplitude. If the carrier amplitude varies slowly relative to the frequency of the carrier, the output will likewise vary slowly. If both the modulating signal and the carrier amplitude vary slowly, the envelope of the modulator output will be proportional to the product of the absolute magnitude of the modulating signal and the absolute magnitude of the envelope of the carrier.

If the carrier is a suppressed carrier amplitude modulated signal and if its modulating signal is the same as that of the thin film modulator, the envelope of the thin film modulator output will be proportional to the square of the amplitude of the modulating signal. Likewise it can be seen that if the sidebands of the second harmonic of the carrier are considered, then the envelope of the output of the thin film modulator will be proportional to the absolute magnitude of the modulating signal to the thin film modulator and to the square of the absolute magnitude of the envelope of the carrier, which for the case where the same modulating signal is used, will be the cube of the absolute magnitude of the modulating signal.

Figure 5:
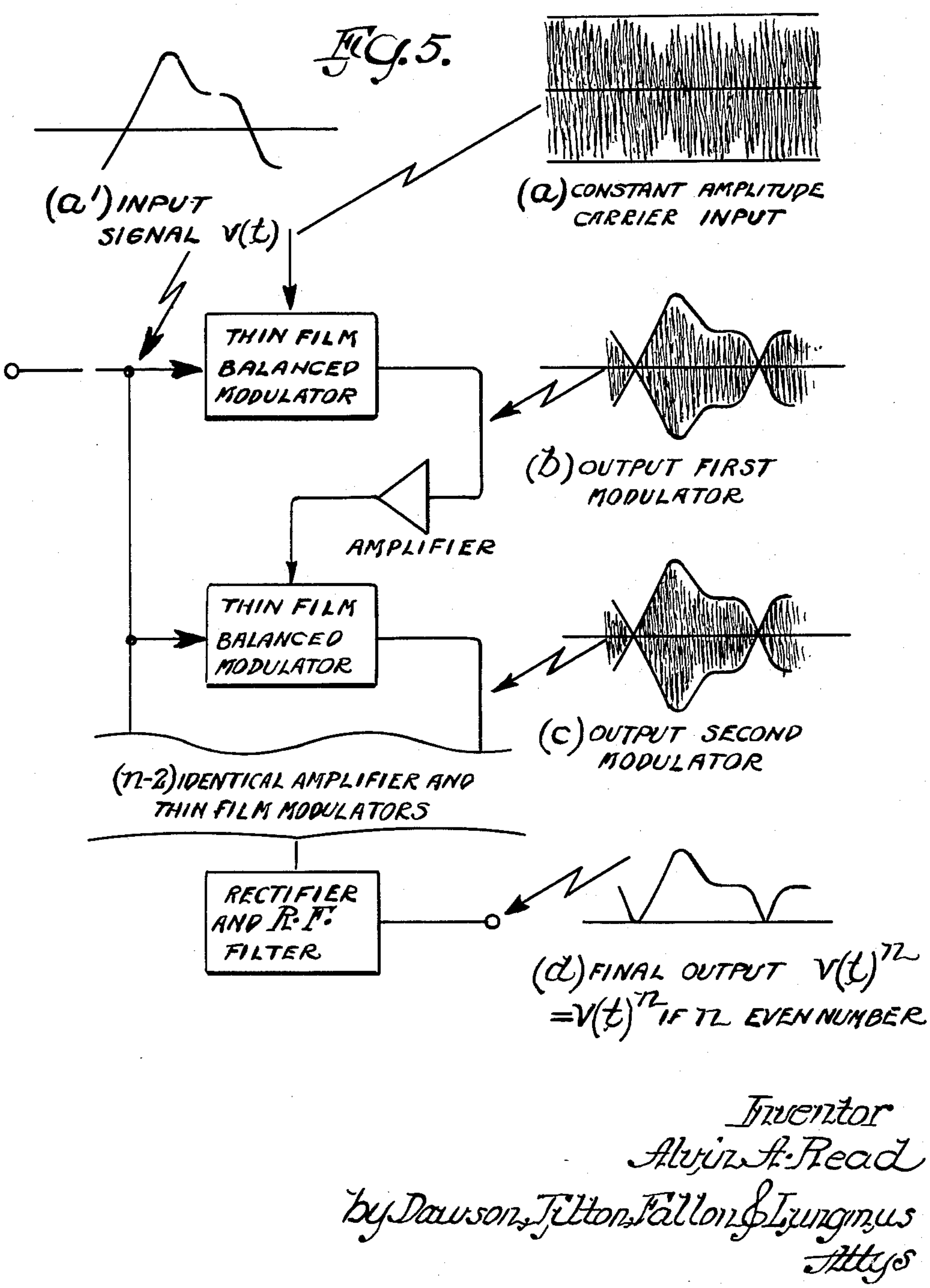
FIG. 5 is a block diagram of a thin film single signal multiplier.

Therefore, using one or the other of the preceding modes of operation, a plurality of balanced modulators, as seen in FIG. 5 for the first mode, it is possible to achieve an output whose envelope is proportional to the $n$th power of the absolute magnitude of a modulating signal of arbitrary wave shape provided the highest frequency component in the modulating signal is substantially less than the frequency of the carrier. In a scheme such as this, the desired information is contained in the envelope of the output of the last balanced modulator. It can be recovered by conventional detection methods.

Figure 6:
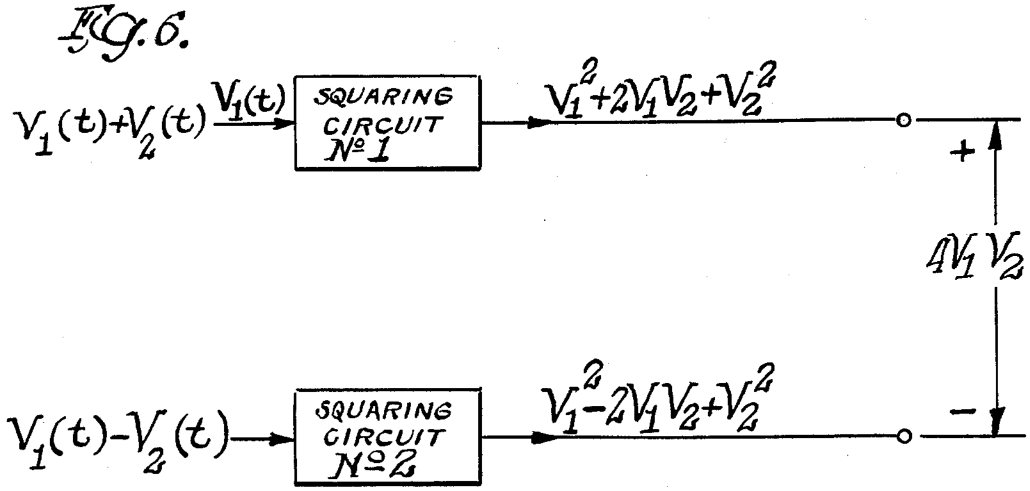
FIG. 6 is a block diagram of a thin film two-signal multiplier.

A particular application of this technique is seen relative to the two-signal multiplier circuit shown in FIG. 6 A modulating signal $v_1+v_2$ is applied to the first squaring circuit and a modulating signal $v_1-v_2$ is applied to the second squaring circuit. The outputs of the two squaring circuits will be $v_1^2+2v_1v_2+v_2^2$ and $v_1^2-2v_1v_2+v_2^2$, respectively. The difference between these outputs is $4v_1v_2$, which is proportional to the instantaneous product of the two input signals $v_1$ and $v_2$. By filtering out the time varying components, the average value of the product of the two signals $v_1$ and $v_2$ can be obtained. If, for example, $v_1$ is proportional to a voltage and $v_2$ is proportional to the current produced by this voltage, the average value of the product $v_1v_2$ will be proportional to the power supplied to a load. Thus, the thin film balanced modulator used in this manner has possibilities of application in electronic wattmeter systems where it will be capable of providing power measurements for signals of arbitrary wave shape with frequency components in the range from direct current to several hundred kilocycles.

A device of this type, in conjunction with suitable external circuitry, permits the direct measurement of the auto-correlation and the cross-correlation functions of signals with frequency components ranging from direct current to several hundred kilocycles. Measurement of power is a special case of this more general application. From this, it can be seen that a thin film two-signal multiplier promises to provide a relatively inexpensive device for use in an area where inexpensive devices of suitable stability and accuracy do not now exist.

The two signal multiplier requires the sum and difference of two signals $v_1$ and $v_2$. There are a number of ways for accomplishing this. One method is to make the modulating winding actually consist of two separate bifilar-wound windings, which, when properly wound and connected, also serve as the output winding. The signals $v_1$ and $v_2$ may then be connected to the two modulating windings in such a manner that their net effects would be either that of $v_1+v_2$ or of $v_1-v_2$. Assuming $v_1$ and $v_2$ were or could be converted to voltage signals, this technique requires only one $v_1$ and one $v_2$ source to feed all modulators. If one used one $v_1$ and both a positive and a negative $v_2$ source, then resistive adder circuits may be used much in the manner illustrated in FIG. 3 for the single modulating source.

Figure 7:
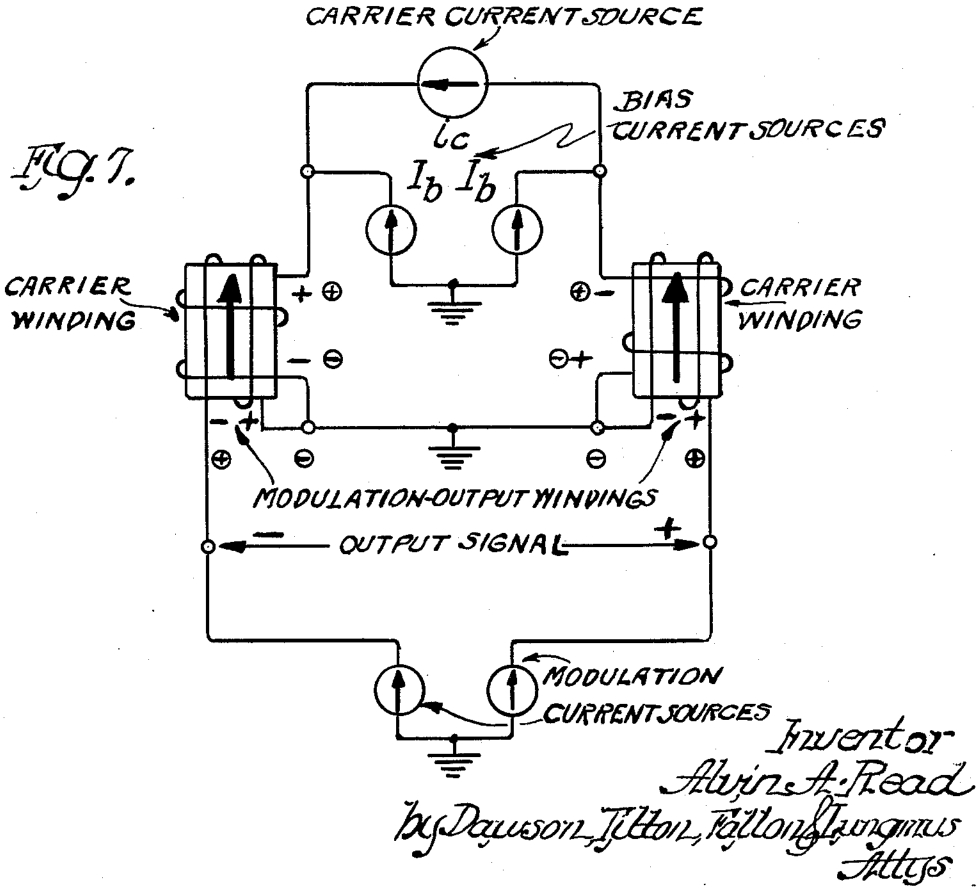
FIG. 7 is a diagram of a modified modulator circuit.

It is also possible to remove or at least minimize the effects due to the modulating signal, i.e., effects of the type associated with the first terms of (5). This can be accomplished by connecting two identical modulators in series such that their outputs are in series adding but their modulating signals are in series opposition as far as overall output is concerned. One arrangement is shown in FIG. 7. The encircled polarity signs correspond to the induced voltages for the low frequency signals of the modulating signal and bias current, while the open polarity signs correspond to the voltages induced by the high frequency carrier signal.

All the preceding discussion assumes that the carrier winding is supplied by a sinusoidal signal at a carrier frequency. This is not necessarily always the case. An example of the use of the balanced modulator circuit configuration as a gating circuit can be discussed in terms of FIG. 7. If a gate signal is applied as the modulating signal, there would be no output signal because of cancellation of the modulation induced transients. If, however, a signal is now impressed on the carrier winding, a resultant voltage is induced in the output winding even though the carrier signal were not sinusoidal or even periodic.

What should be understood is that the gating procedure is not concerned with a way of impressing an additional signal but rather a way of using the balanced modulator configuration (as in FIG. 7) to gate out a signal impressed on the carrier winding. From this, it follows that the carrier winding signal does not necessarily have to be a sinusoidal one, as assumed in the previous discussion. For example, one might envision the device with pulses being occasionally applied to the carrier winding. In the absence of any gating signal to the modulating winding, there would be no output even with pulses on the carrier winding. Also, with a specific circuit configuration such as FIG. 7, transients resulting from the application of the gating signal would effectively be cancelled so that no output would result in the absence of a carrier winding pulse. However, when a carrier winding pulse is present at the same time as the gate signal, then there is an output pulse. More specifically, for a rectangular gating pulse, the output is proportional to the time rate of change of the carrier winding current. Except for the D.C. level, the shape of the input pulses can be reconstructed, if necessary, by integrating the output or employing an amplified version of the output. Thus, this mode of operation is that of a coincident circuit in which an output is possible only when two inputs are simultaneously present.

While, in the foregoing specification, a detailed description of the invention has been given for the purpose of explanation, many variations in the details herein given may be made by those skilled in the art without departing from the spirit and scope of the invention.

I claim:

1. A modulator element, comprising a single domain ferromagnetic film, a pair of windings orthogonally arranged on said film, one of said windings being coupled to means for introducing a carrier frequency signal, the other of said windings being coupled to means for receiving a modulated carrier signal, and means for impressing a modulating signal on said other winding, the axis of said carrier frequency winding being parallel with the rest direction of said film.

2. The structure of claim 1 in which said element includes a plurality of single domain ferromagnetic films, at least two of said films being superposed in parallel relation, insulating means between said two films, said orthogonally arranged windings being positioned between said two films.

3. The structure of claim 1 in which electrostatic shield means is interposed between said windings to reduce the capacitive coupling therebetween.

4. A modulator element, comprising a single domain ferromagnetic film, a pair of winding means orthogonally arranged on said film, one of said winding means being coupled to means for introducing a carrier frequency signal, the other of said winding means being coupled to means for receiving a modulated carrier signal, and means for impressing a modulating signal on said other winding means, the axis of said carrier frequency winding means being parallel with the rest direction of said film. the said other winding means having a hormonic-suppressing capacitance.

5. The structure of claim 4 in which said other winding means comprises a pair of windings, one of said windings providing an output signal, the other of said windings being coupled to said impressing means.

6. A modulator element, comprising a single domain magnetic film, a pair of windings orthogonally arranged on said film, one of said windings being coupled to means for introducing a carrier frequency signal thereto and being oriented generally parallel with the rest direction of the film, and means for applying an external magnetic field to said film to substantially eliminate the induction of carrier voltage in the other winding when no modulating signal is applied to said other winding.

References Cited by the Examiner

UNITED STATES PATENTS

| | | | |
|---|---|---|---|
| 2,782,376 | 2/1957 | Mortimer | 332—51 |
| 2,883,604 | 4/1959 | Mortimer | 340—197 X |
| 2,984,825 | 5/1961 | Fuller | 340—174 |
| 2,997,695 | 8/1961 | Conger et al. | 340—174 |

FOREIGN PATENTS

| | | |
|---|---|---|
| 592,241 | 9/1947 | Great Britain. |

OTHER REFERENCES

Electronics (1) "Thin Film Balanced Modulator," Feb. 26, 1960, pp. 78, 80.

Electronics (2) "Parametric Amplifier Uses Thin Films," Nov. 13, 1959, pp. 92, 94 and 95.

IBM Technical Disclosure Bulletin, Stuckert, vol. 2, No. 5, February 1960, p. 78.

Proceedings of the National Electronics Conf., 1959 Pub. Mar. 21, 1960, pp. 65 to 78.

ROY LAKE, *Primary Examiner.*

L. MILLER ANDRUS, ALFRED L. BRODY, *Examiners.*